United States Patent
Lim

(10) Patent No.: US 10,378,614 B2
(45) Date of Patent: Aug. 13, 2019

(54) INTERNAL PLANETARY REDUCTION GEAR

(71) Applicant: SEJIN-IGB CO., LTD., Asan-si, Chungcheongnam-do (KR)

(72) Inventor: Sun Ho Lim, Asan-si (KR)

(73) Assignee: SEJIN-IGB CO., LTD. (KR)

( * ) Notice: Subject to any disclaimer, the term of this patent is extended or adjusted under 35 U.S.C. 154(b) by 38 days.

(21) Appl. No.: 15/575,377

(22) PCT Filed: Mar. 4, 2016

(86) PCT No.: PCT/KR2016/002178
§ 371 (c)(1),
(2) Date: Nov. 19, 2017

(87) PCT Pub. No.: WO2016/200017
PCT Pub. Date: Dec. 15, 2016

(65) Prior Publication Data
US 2018/0149237 A1 May 31, 2018

(30) Foreign Application Priority Data
Jun. 8, 2015 (KR) .................. 10-2015-0080574

(51) Int. Cl.
F16H 1/32 (2006.01)
F16H 1/46 (2006.01)
(Continued)

(52) U.S. Cl.
CPC .............. F16H 1/46 (2013.01); F16H 1/28 (2013.01); F16H 1/32 (2013.01); F16H 3/00 (2013.01);
(Continued)

(58) Field of Classification Search
CPC ..... F16H 1/28; F16H 1/32; F16H 1/46; F16H 3/00; F16H 3/44; F16H 2001/323; F16H 2001/325; H02K 7/116
(Continued)

(56) References Cited

U.S. PATENT DOCUMENTS 4,348,918 A * 9/1982 Fukui ..................... F16H 1/32
475/179
4,690,010 A * 9/1987 Matsumoto ........... B25J 9/102
310/83
(Continued)

FOREIGN PATENT DOCUMENTS

EA 016184 B1 3/2012
EP 2439426 A1 4/2012
(Continued)

OTHER PUBLICATIONS

Supplementary European Search Report for Application No. 16807660.2 dated Apr. 26, 2018.

*Primary Examiner* — Leslie A Nicholson, III
(74) *Attorney, Agent, or Firm* — Renaissance IP Law Group LLP

(57) ABSTRACT

Disclosed is an internal planetary reduction gear. The internal planetary reduction gear according to an embodiment of the present invention comprises: an internal-gear integrated main body that has an internal gear integrally formed on the inner wall thereof and is provided with a plurality of components for speed reduction; an input shaft module formed as a single body by coupling at least two separated parts with each other, wherein the input shaft module has an input gear formed on an end portion thereof and is connected to the internal-gear integrated main body to receive rotary power from a motor that is connected to the exterior of the internal-gear integrated main body; and an output shaft module that is connected to the input shaft module to interact
(Continued)

therewith and reduces the speed of the rotary power of the motor, which is input from the input shaft module, to output the same.

15 Claims, 12 Drawing Sheets

(51) Int. Cl.
  *F16H 3/00* (2006.01)
  *F16H 1/28* (2006.01)
  *F16H 3/44* (2006.01)
  *H02K 7/116* (2006.01)
(52) U.S. Cl.
  CPC ............... *F16H 3/44* (2013.01); *H02K 7/116* (2013.01); *F16H 2001/323* (2013.01); *F16H 2001/325* (2013.01)
(58) Field of Classification Search
  USPC .......................................................... 475/478
  See application file for complete search history.

(56) References Cited

U.S. PATENT DOCUMENTS

| | | | |
|---|---|---|---|
| 4,909,102 A | 3/1990 | Haga | |
| 4,967,615 A * | 11/1990 | Mills | F16H 29/04 74/117 |
| 5,472,384 A * | 12/1995 | Haga | F16H 1/32 475/162 |
| 6,033,333 A * | 3/2000 | Muraki | F16H 1/32 475/178 |
| 6,761,660 B2 * | 7/2004 | Lim | F16H 1/32 475/162 |
| 8,435,149 B2 * | 5/2013 | Koyama | B25J 9/102 475/162 |
| 8,827,052 B2 * | 9/2014 | Yu | B60T 13/746 180/65.51 |
| 8,893,569 B2 * | 11/2014 | Lim | F16H 19/04 184/6.12 |
| 9,033,840 B2 * | 5/2015 | Nomura | F16H 1/32 475/150 |

FOREIGN PATENT DOCUMENTS

| | | |
|---|---|---|
| JP | 57040753 U1 | 8/1955 |
| JP | H07301287 A | 11/1995 |
| JP | 2010286098 A | 12/2010 |
| JP | 2013533442 A | 8/2013 |
| KR | 20000020021 A | 4/2000 |
| KR | 20000058349 A | 10/2000 |
| KR | 20050022902 A | 3/2005 |
| KR | 101009742 BI | 1/2011 |
| WO | 0181789 A1 | 11/2001 |
| WO | 02052176 A1 | 7/2002 |
| WO | 2012060610 A2 | 5/2012 |
| WO | 2014046436 A2 | 3/2014 |

* cited by examiner

INTERNAL PLANETARY REDUCTION GEAR

TECHNICAL FIELD

The present inventive concept relates to an internal planetary reduction gear, and more particularly, to an internal planetary reduction gear which may improve a reduction range compared to the related art, and reduce an installation volume as an input shaft can be easily installed without a constraint of penetrability of the input shaft or a condition of using a separate auxiliary structure.

BACKGROUND ART

In general, automation and precision control apparatuses use a speed reducer (or a power transmission device) to reduce and transfer a rotational speed of a high load transferred via a drive shaft of a power source such as an electric motor, a servo motor, etc.

Recently, as equipment becomes compact, a speed reducer is also required to be miniaturized while precisely operating.

A speed reducer according to the related art includes RV series of Vigo Drive™ developed and sold by Teijin Seiki.

The Teijin Seiki's RV series includes a plurality of pin gears and a plurality of 1-stage reduction gears at an output end side to secure, in an input shaft, an insertion space in an axial direction to insert a drive shaft of a power source, and transfers a reduced motion.

However, the Teijin Seiki's RV series speed reducer has the following problems.

First, since a plurality of pin gears are used, during calculation of a reduction ratio, the reduction ratio is frequently calculated to be a noninterminating decimal. Thus, when the speed reducer is repeatedly operated, errors are accumulated and thus a degree of precision of a speed reduction motion deteriorates remarkably.

Second, since the diameter of an output end side portion of the input shaft decreases in order to place the 1-stage reduction gear at the output end side, the speed reducer may be easily applied to a high reduction ratio. However, in order to apply the speed reducer to a low reduction ratio, separate components need to be added, and thus the speed reducer becomes large.

Third, since the 1-stage reduction gear is located at the output end, in order to prevent oil such as grease from leaking from a peripheral portion of the 1-stage reduction gear, a plurality of separate sealing components are provided on an outer circumferential surface of each 1-stage reduction gear, and thus the manufacturing costs and weight of the speed reducer are increased.

Fourth, as the 1-stage reduction gear are located at the output end side, while the size in a lengthwise direction of the insertion space in the input shaft to inert the drive shaft of the power source is guaranteed, the inner diameter of the insertion space may be quite limited due to the user of the pin gear.

Fifth, when the 1-stage reduction gear is installed at an input end side to overcome the above-described problems, the diameter of the insertion space to couple the drive shaft of the power source in a main body having a predetermined diameter is much decreased due to the 1-stage reduction gear. In particular, a speed reducible range is much limited.

Sixth, since the pin gear is employed, the number of pins to be accommodated in a predetermined main body is limited due to the diameter of a pin (about 2 mm), which may much limit the reduction range of the speed reducer.

As another speed reducer according to the related art, Korean Patent No. 1002422070000 (Prior Art 1) filed by the present applicant discloses an internal planetary reduction gear using a main crank shaft coupled to a drive shaft of a power source in an Oldham coupling method and receiving a rotational force from the power source, a plurality of planetary gears performing a speed reduction motion while performing a translational rotational motion according to the rotation of the auxiliary crank shaft, and a plurality of auxiliary crank shafts performing a translational rotational motion interconnected to the planetary gears.

However, in the speed reducer disclosed in the above-described Prior Art 1, since the auxiliary crank shafts are interconnected to the planetary gears that perform a translational rotational motion, the rotational motion of the main crank shaft and the rotational motion of the auxiliary crank shafts may not completely match each other due to processing, assembly, and deformation. In other words, the rotation motions of the auxiliary crank shafts are not restricted.

In this state, during a motion of the auxiliary crank shaft or when a load is applied from the outside, auxiliary crank shaft periodically vibrates in the rotational direction thereof, and thus continuity and precision in the power transfer may be reduced.

Accordingly, to solve the above problem, another invention was field by the present applicant and registered as Korean Patent No. 1003011200000 (Prior Art 2) which discloses an internal planetary reduction gear capable of miniaturization while maintaining continuity and precision in the power transfer with reliability.

However, in the speed reducer disclosed in the above-described Prior Art 2, since an input shaft is provided as one body, when a tooth shape on an outer circumferential surface of a rear end portion of the input shaft is greater than the space at the center of the speed reducer, the input shaft is unable to pass through a center space of a main body of the speed reducer so that the input shaft may not be installed at all or a separate auxiliary structure for the installation is needed. Consequently, an installation volume may be difficult to be reduced, and accordingly implementation of a relatively low reduction ratio may be restricted. Also, since it is known that a reduction range may be reduced, there is a demand for research and development of a new and improved internal planetary reduction gear which may solve the above problem.

DETAILED DESCRIPTION OF THE INVENTIVE CONCEPT

Technical Problem

The present inventive concept provides an internal planetary reduction gear which may improve a reduction range compared to the related art, and reduce an installation volume as an input shaft can be easily installed without a constraint of penetrability of the input shaft or a condition of using a separate auxiliary structure.

Advantageous Effects

According to the present inventive concept, since an input shaft can be easily installed without a constraint of penetrability of the input shaft or a condition of using a separate auxiliary structure, an installation volume may be reduced and a reduction range may be improved compared to the related art.

BEST MODE

Figure 1:
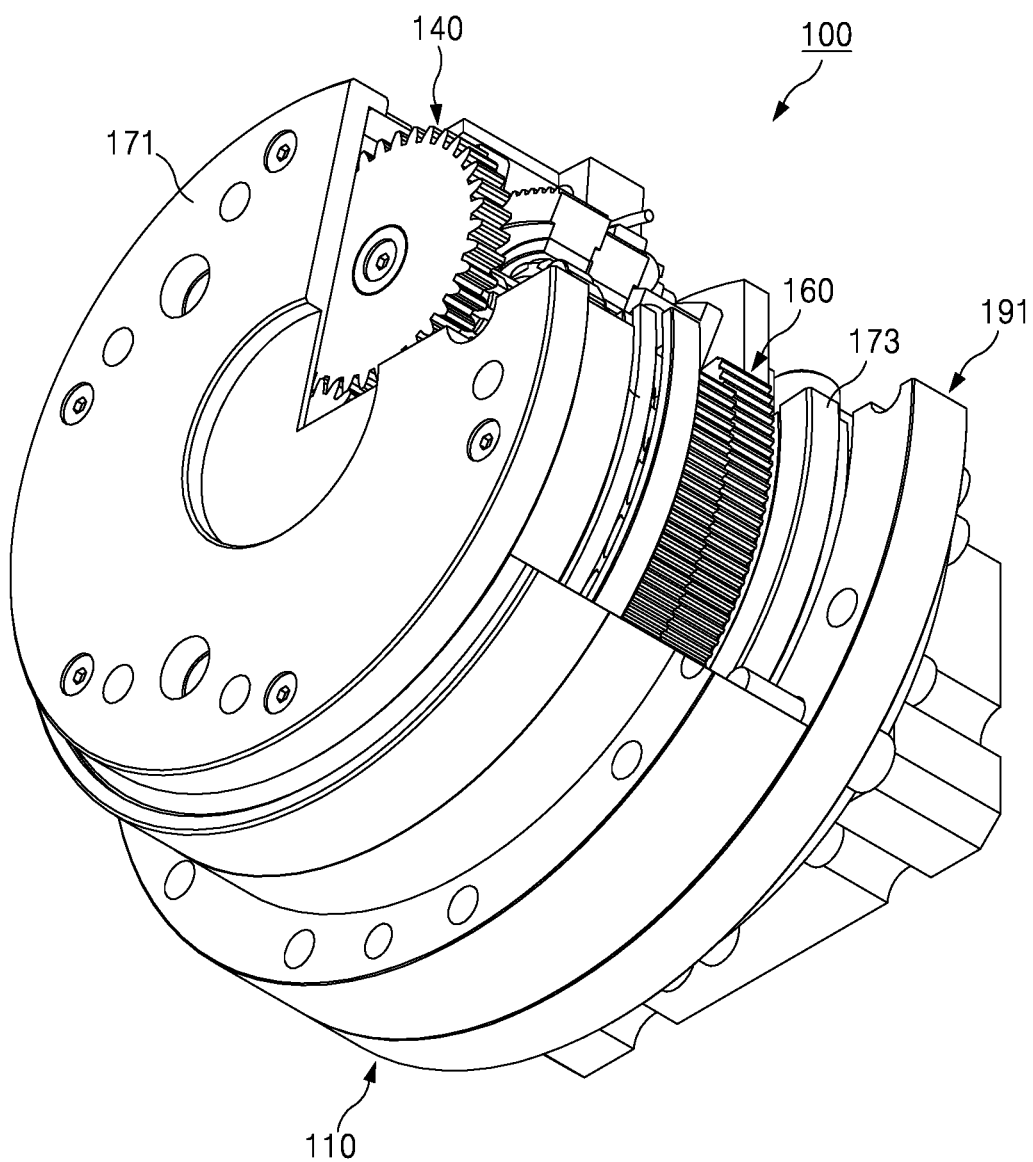
FIG. 1 is a partially cut-away perspective view of an internal planetary reduction gear according to an embodiment.

According to an aspect of the present inventive concept, an internal planetary reduction gear includes: an internal-gear integrated main body having an internal gear integrally formed on an inner wall thereof, and on which a plurality of components for speed reduction are mounted; an input shaft module formed as a single body by coupling at least two separated parts with each other, having an input gear formed on an end portion thereof, and connected to the internal-gear integrated main body to receive rotary power from a motor that is connected to an exterior of the internal-gear integrated main body; and an output shaft module connected to the input shaft module to interact therewith and reducing and outputting a speed of the rotary power of the motor that is input from the input shaft module.

The input shaft module may include: a first input shaft module having one end portion arranged at a side of the output shaft module; and a second input shaft module connected to the motor and coupled to the first input shaft module.

The first input shaft module may include; a first module head arranged at the side of the output shaft module and having an outer surface to which the input gear is connected; and a first module shaft connected to the first module head and inserted into the second input shaft module.

The second input shaft module may include: a second module body having a shaft hole in which the first module shaft is inserted; and a second module tail connected to the second module body, formed to have a diameter greater than the second module body, and having a plurality of cut portions formed on an end portion thereof.

A key block may be formed on an outer wall of the first module shaft to restrict arbitrary rotation of the first input shaft module, and a key groove, into which the key block is inserted to correspond to the shape thereof, may be formed in the shaft hole.

The input gear may have a wedge-type tooth shape.

The internal planetary reduction gear may further include a plurality of isotropic 1-stage planetary gears that are arranged in a circumferential direction of the first module head and meshed with an input gear of the first module head to be interlocked with each other.

The plurality of isotropic 1-stage planetary gears may be arranged at a side of the output shaft module.

The internal planetary reduction gear may further include a plurality of crank shafts, each crank shaft including: a rotary shaft having one end portion connected to each of the plurality of isotropic 1-stage planetary gears and rotated according to a rotation of each of the isotropic 1-stage planetary gears; and an eccentric cam connected to the rotary shaft with a phase difference of a predetermined interval.

A D-cut processed portion may be formed on one end portion of the rotary shaft to prevent idling of the plurality of crank shafts and the plurality of the isotropic 1-stage planetary gears, and a non-circular hole, to which the D-cut processed portion is coupled, may be formed in each of the plurality of the isotropic 1-stage planetary gears.

The internal planetary reduction gear may further include a plurality of conjugate planetary gears, wherein a module through-hole, through which the input shaft module passes, may be formed at a center portion of each of the plurality of conjugate planetary gears, an external gear meshed with an internal gear of the internal-gear integrated main body may be formed on an outer wall of each of the plurality of conjugate planetary gears, and each of the plurality of conjugate planetary gears may be connected to the eccentric cam of each of the plurality of crank shafts and may perform a translational rotational motion according to a rotation of the plurality of crank shafts.

The output shaft module may include: a flat output shaft having a center portion at which the input gear of the input shaft module is arranged; and a precession prevention plate coupled to the flat output shaft and preventing generation of a precessional motion.

The output shaft module may further include a vibration prevention pin that is coupled to the flat output shaft and the precession prevention plate and preventing output vibration.

A plurality of spaced legs, in which a plurality of blot holes are formed, may be provided at one side of the flat output shaft toward the precession prevention plate, and a plurality of through-holes connected to the plurality of bolt holes of the plurality of spaced legs may be formed in the precession prevention plate, the flat output shaft and the precession prevention plate, which are spaced apart from each other as long as the plurality of the spaced legs, may be coupled to each other by using the plurality of bolts, forming one body, and a plurality of pin holes may be formed in each of the flat output shaft and the precession prevention plate so that the vibration prevention pin is coupled between the flat output shaft and the precession prevention plate, wherein the pin hole formed in the flat output shaft is arranged around the plurality of bolt holes of the plurality of spaced legs.

The internal planetary reduction gear may further include an input shaft installation plate that is coupled to one side of the internal-gear integrated main body for installation of the input shaft module.

The internal planetary reduction gear may further include a motor installation plate that is coupled to the input shaft installation plate for installation of the motor.

The internal planetary reduction gear may further include an input shaft clamp that is connected to the motor installation plate and clamping the input shaft module, wherein the input shaft clamp may include: a clamp body having a cut portion; and a fastening screw provided at the cut portion of the clamp body and fastening the cut portion of the clamp body.

[Mode of the Inventive Concept]

The attached drawings for illustrating preferred embodiments of the present inventive concept are referred to in order to gain a sufficient understanding of the present inventive concept, the merits thereof, and the objectives accomplished by the implementation of the present inventive concept.

Hereinafter, the present inventive concept will be described in detail by explaining preferred embodiments of the inventive concept with reference to the attached drawings. Like reference numerals in the drawings denote like elements.

Figure 2:
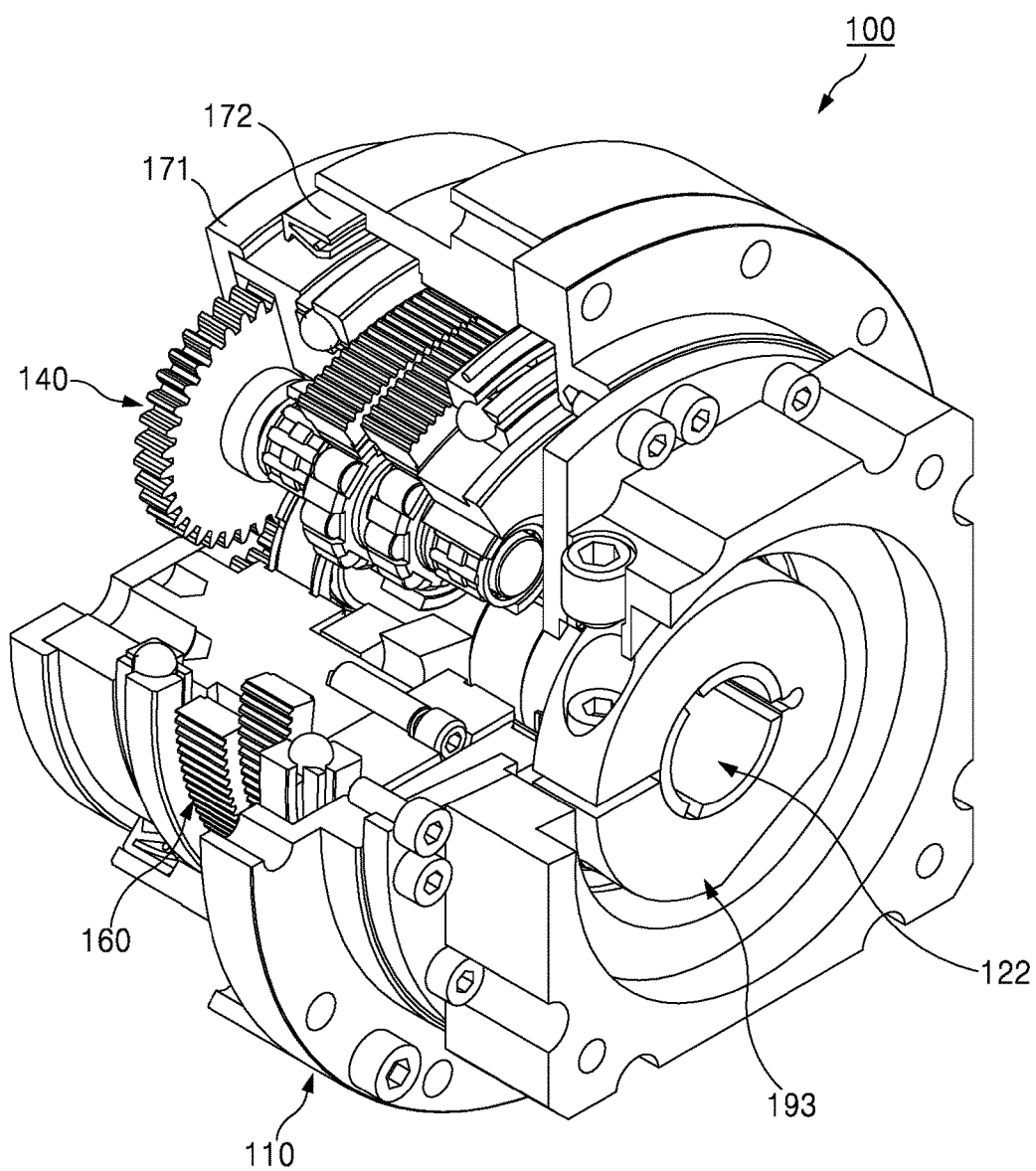
FIG. 2 illustrates FIG. 1 at a different angle.
Figure 3:
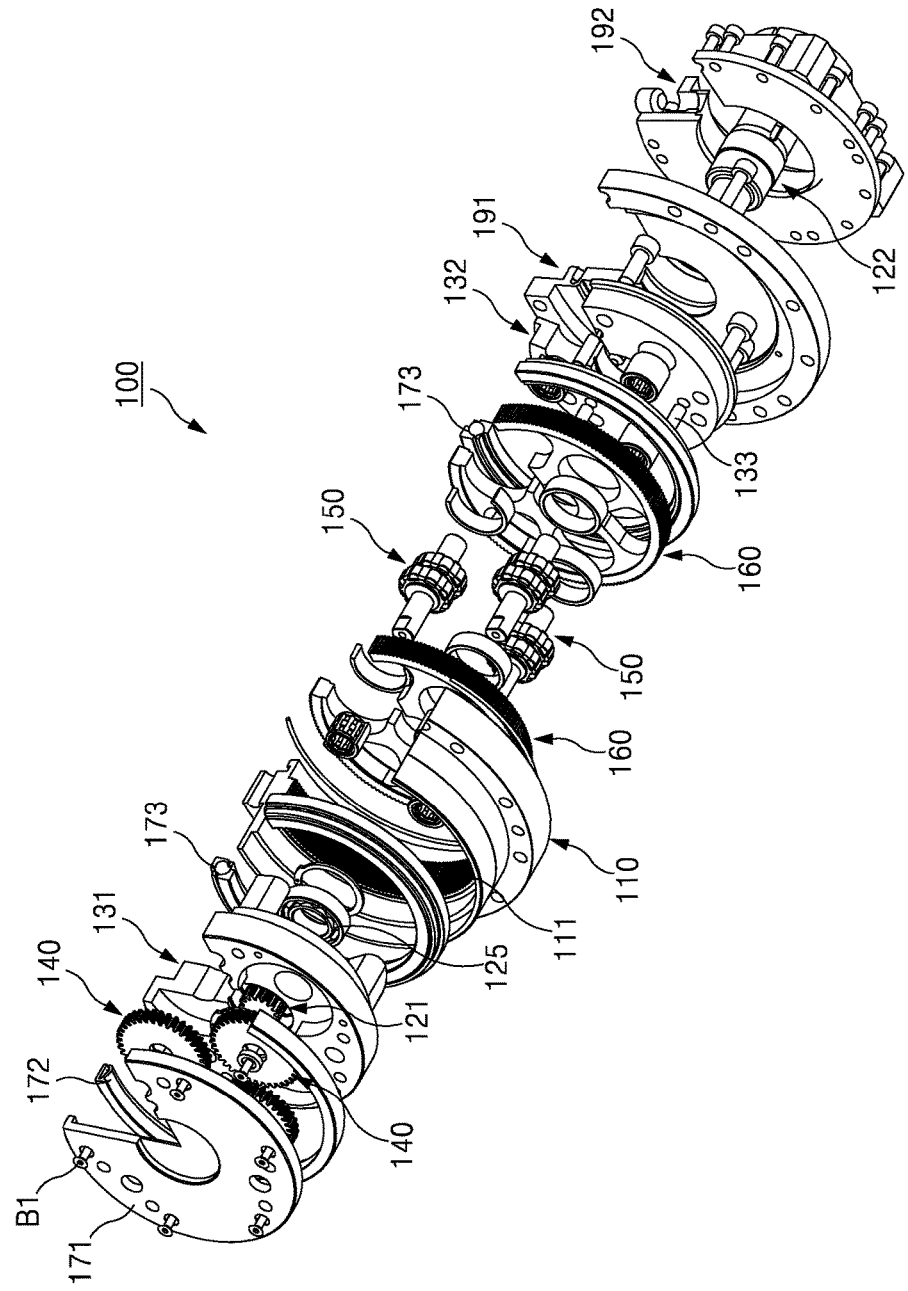
FIG. 3 is an exploded perspective view of FIG. 1.
Figure 4:
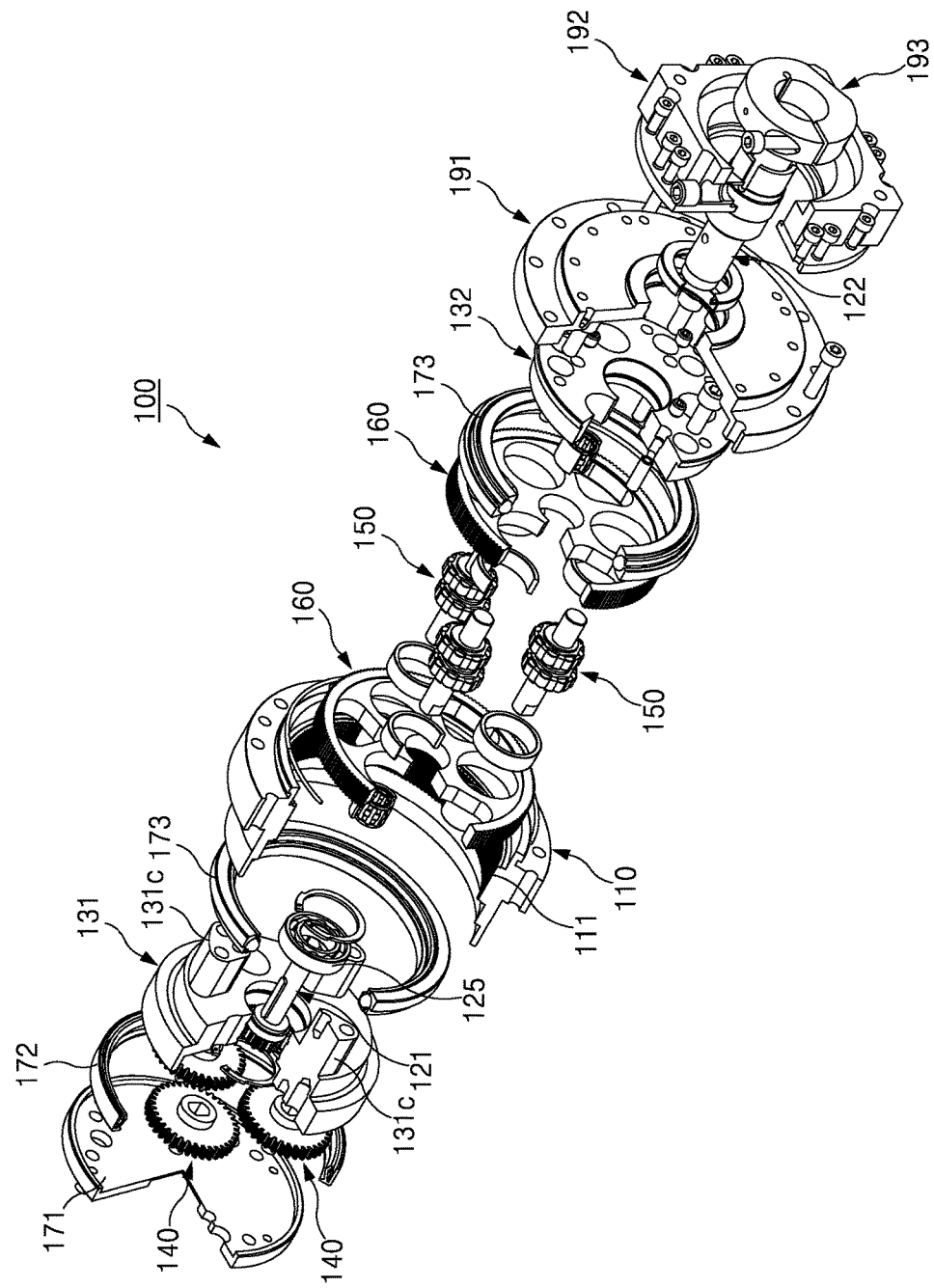
FIG. 4 is an exploded perspective view of FIG. 2.
Figure 5:
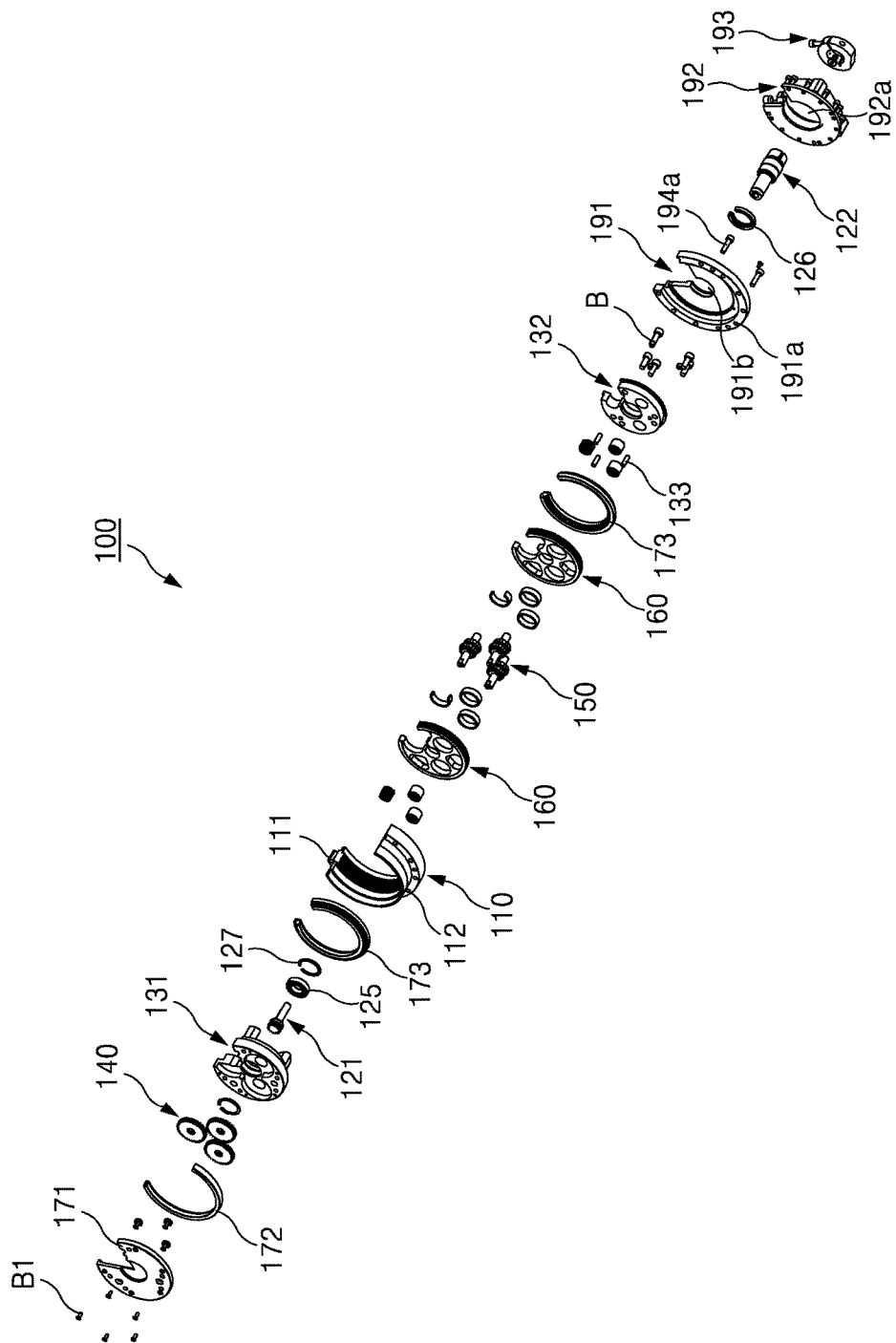
FIG. 5 illustrates FIG. 3 in detail.
Figure 6:
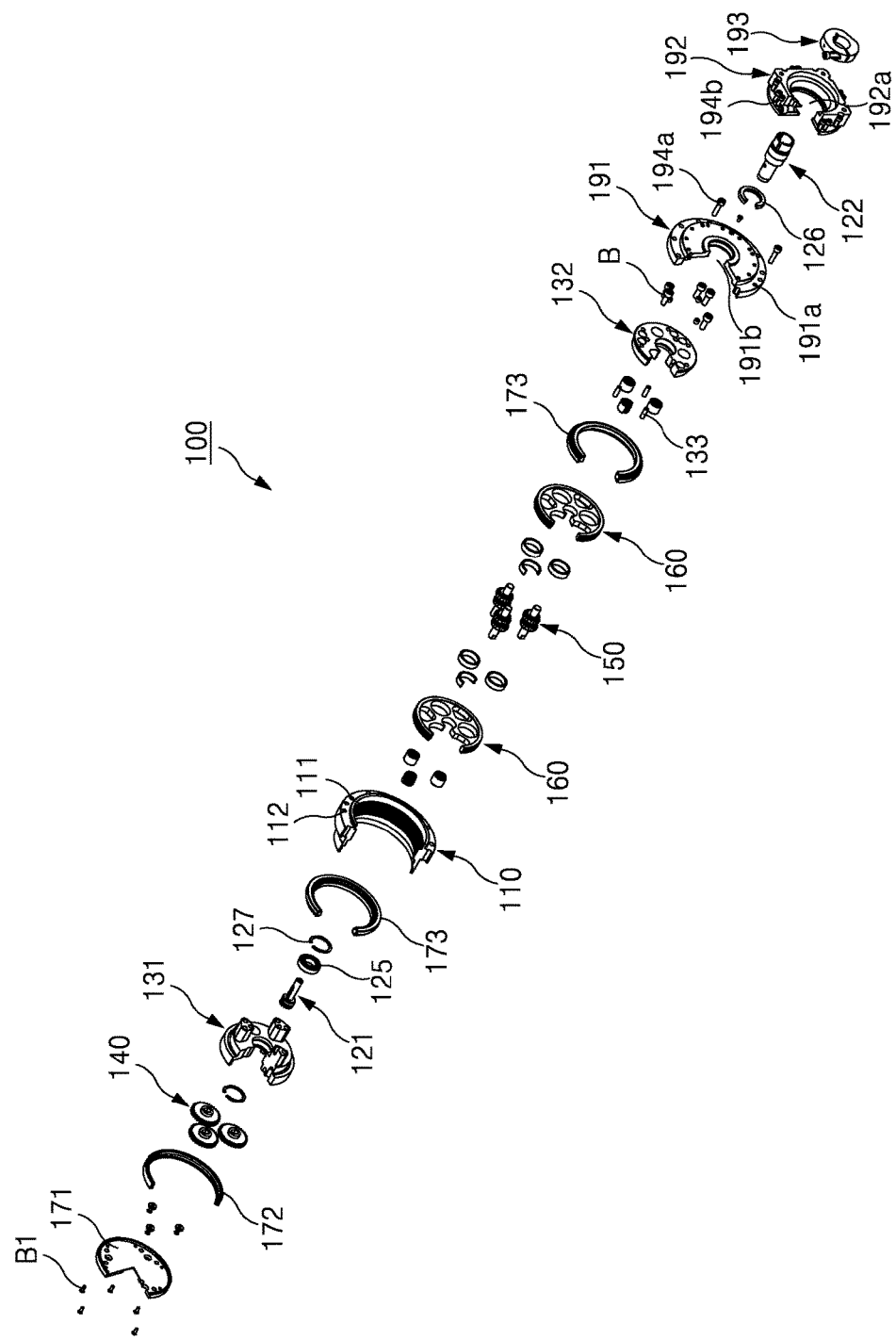
FIG. 6 illustrates FIG. 4 in detail.
Figure 7:
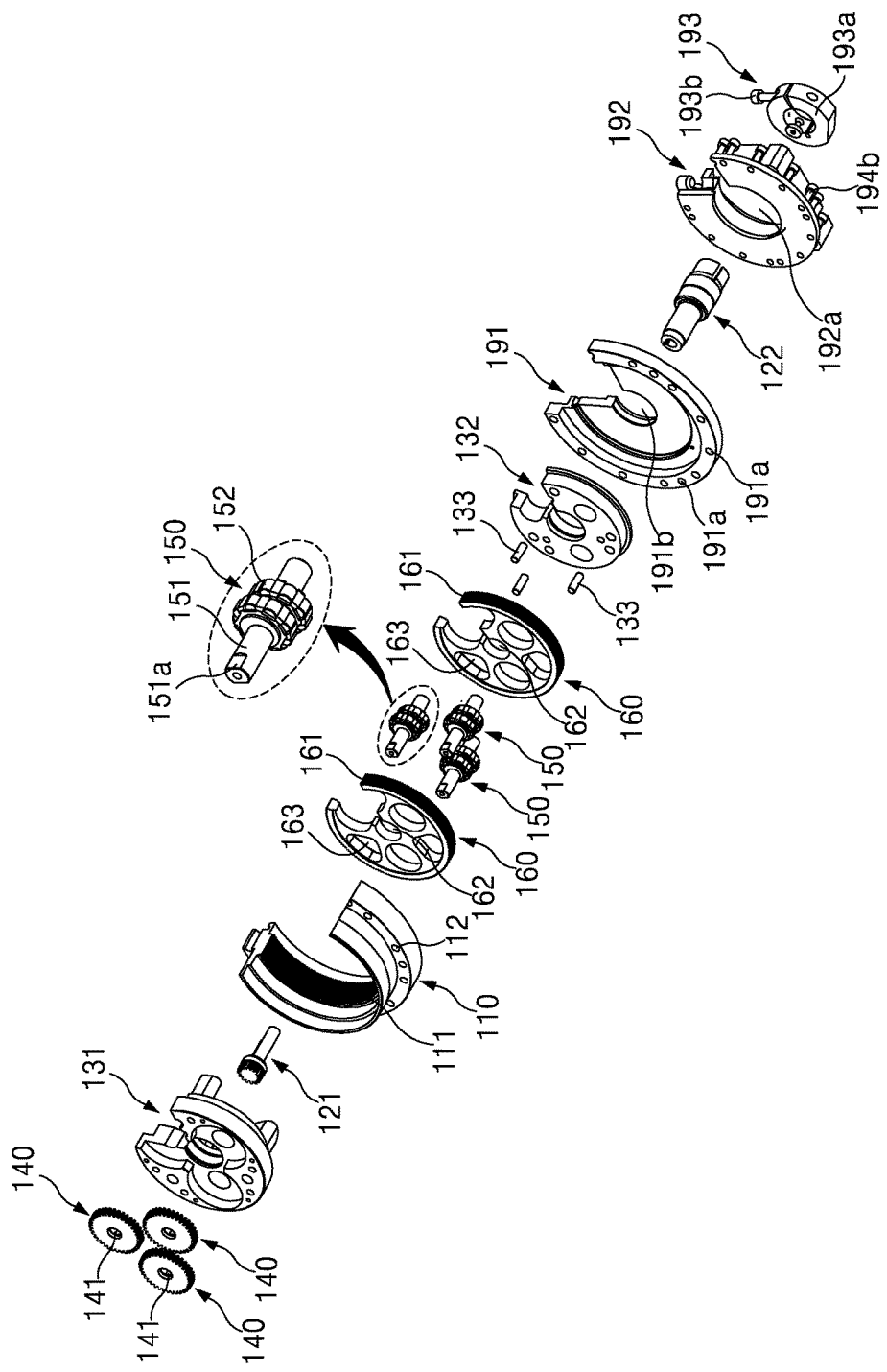
FIG. 7 illustrates only a partial configuration of FIG. 5.
Figure 8:
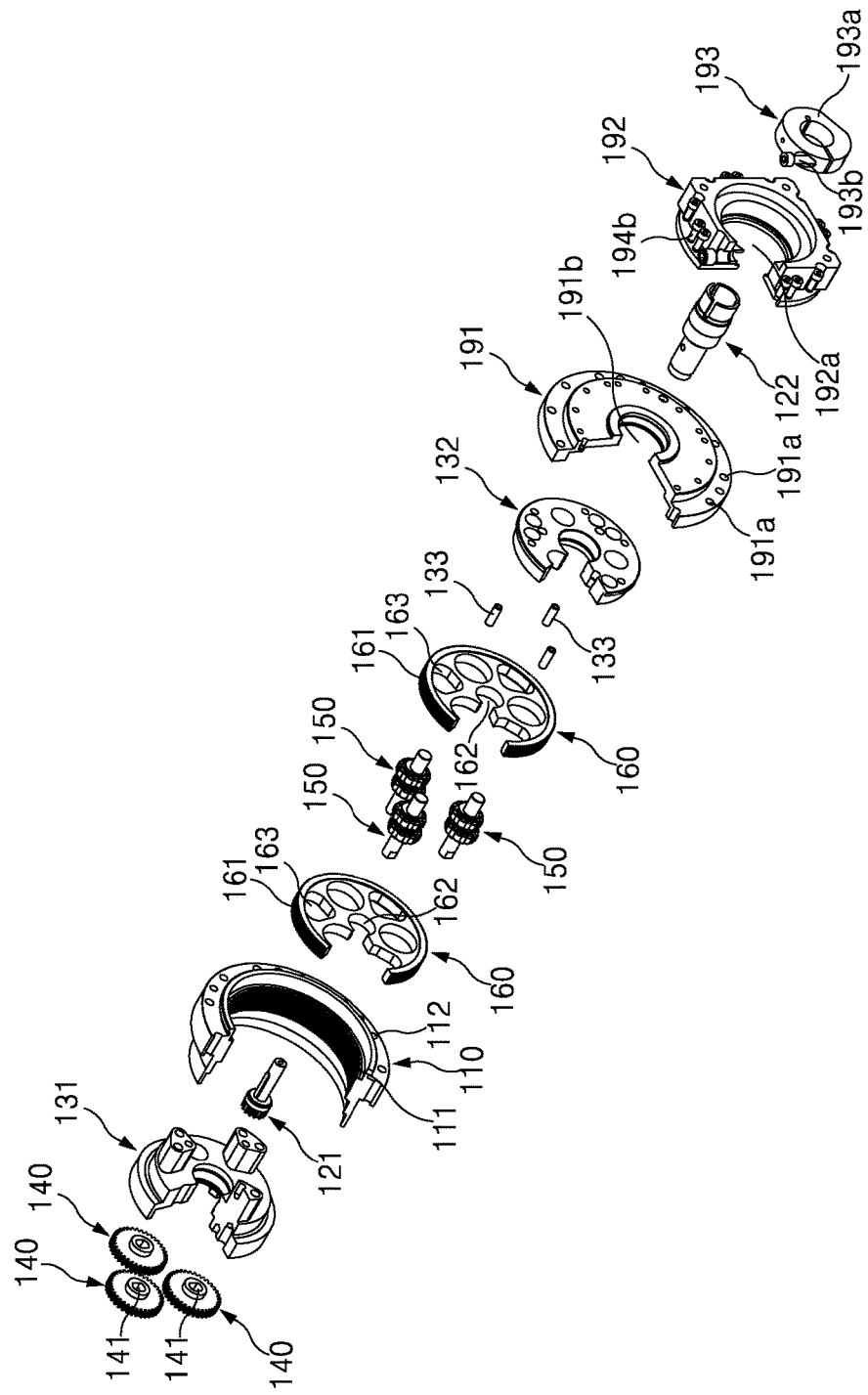
FIG. 8 illustrates only a partial configuration of FIG. 6.
Figure 9:
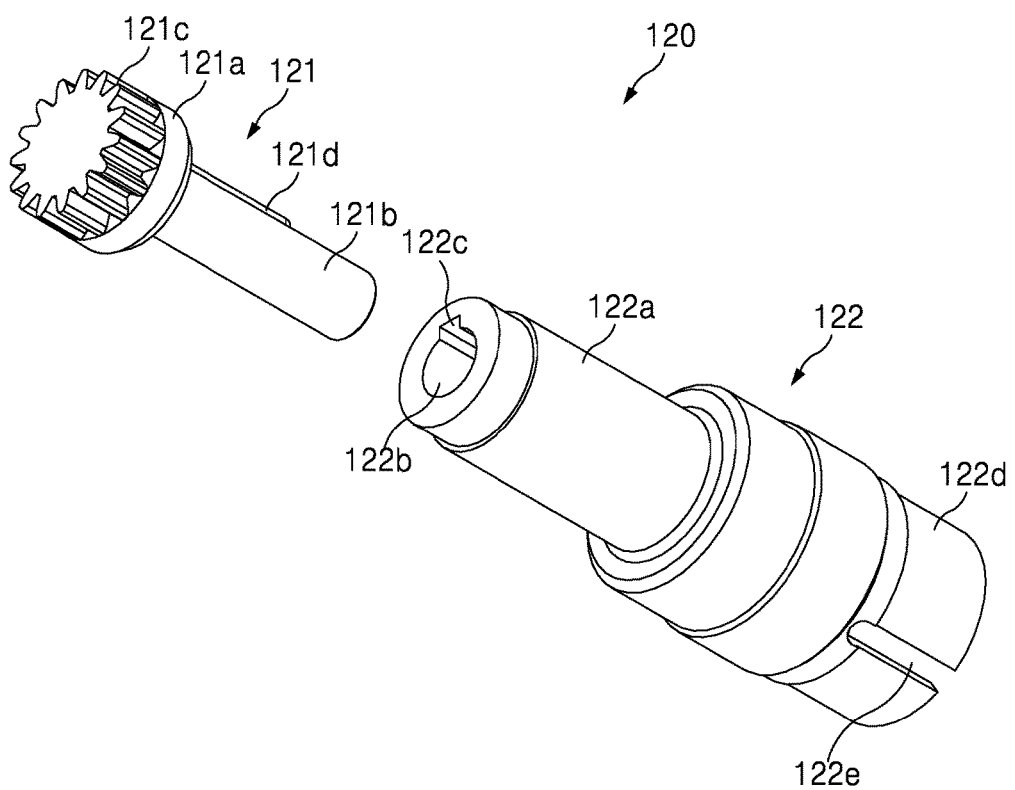
FIGS. 9 and 10 are exploded views of an input shaft module.
Figure 10:
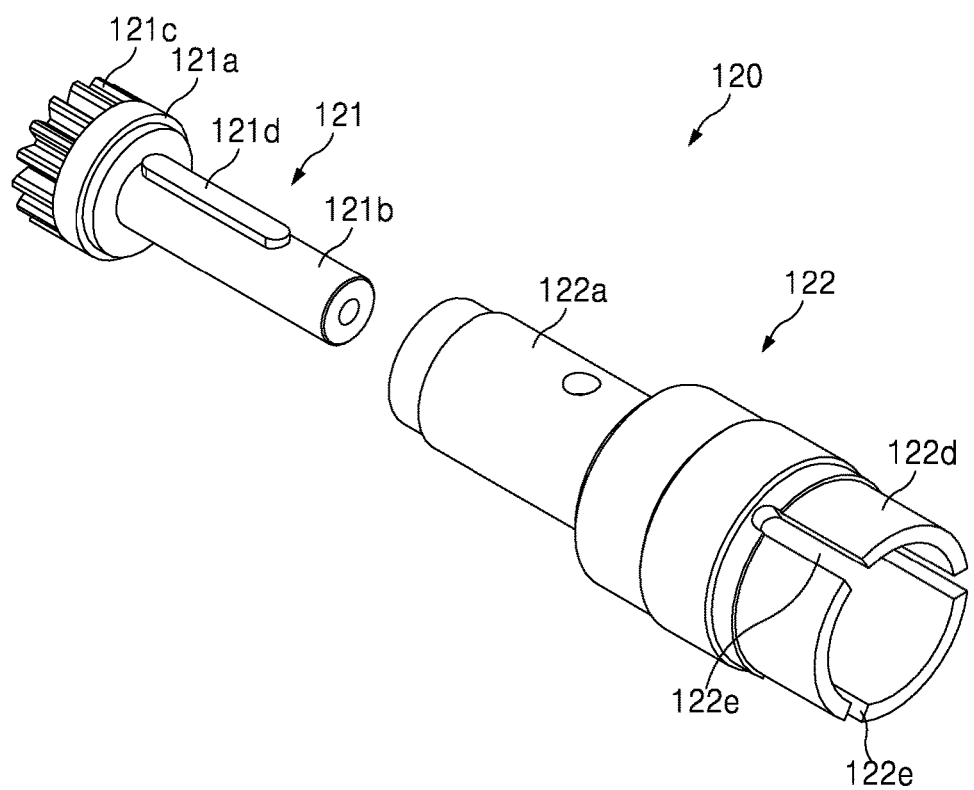
Figure 11:
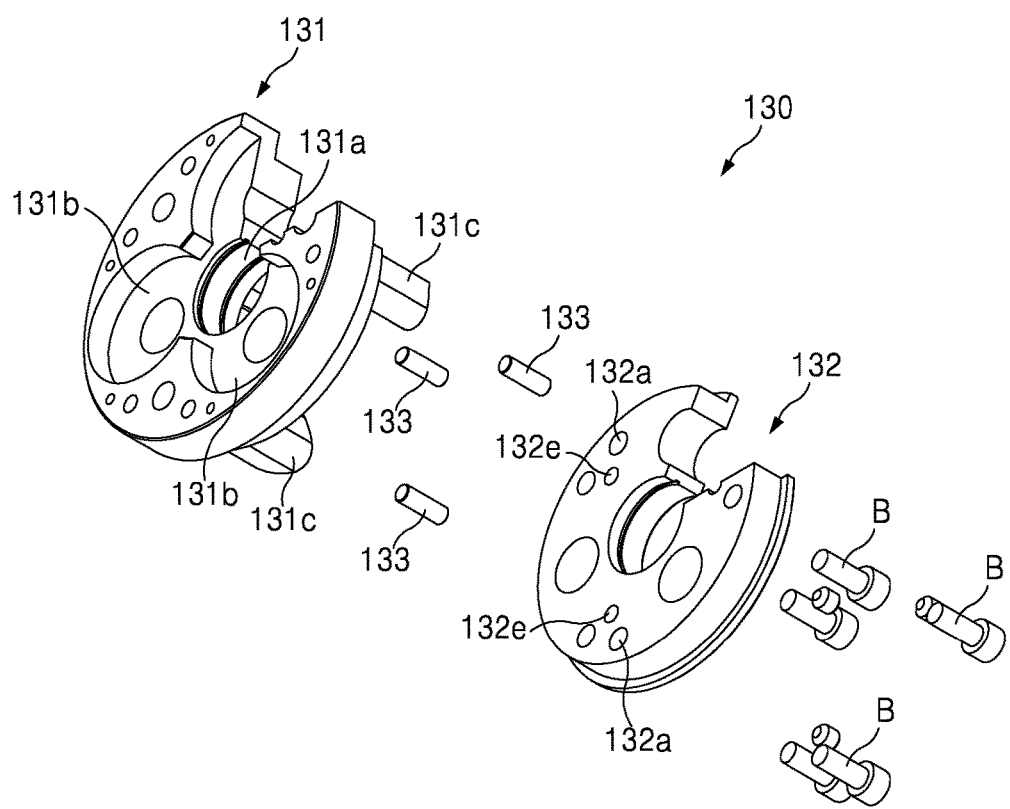
FIGS. 11 and 12 are exploded views of the output shaft module.
Figure 12:
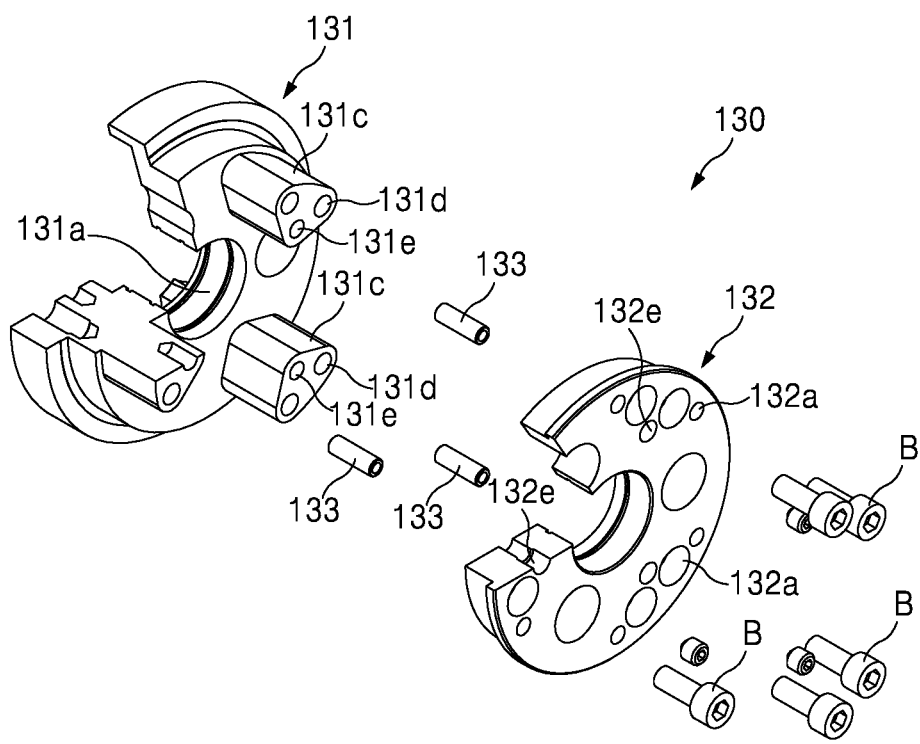

FIG. 1 is a partially cut-away perspective view of an internal planetary reduction gear according to an embodiment. FIG. 2 illustrates FIG. 1 at a different angle. FIG. 3 is an exploded perspective view of FIG. 1. FIG. 4 is an exploded perspective view of FIG. 2. FIG. 5 illustrates FIG. 3 in detail. FIG. 6 illustrates FIG. 4 in detail. FIG. 7 illustrates only a partial configuration of FIG. 5. FIG. 8 illustrates only a partial configuration of FIG. 6 FIGS. 9 and 10 are exploded views of an input shaft module. FIGS. 11 and 12 are exploded views of an output shaft module.

Referring to the above drawings, an internal planetary reduction gear 100 according to the present embodiment, which may improve a reduction range and reduce an installation volume as an input shaft, that is, an input shaft module 120 can be easily installed without a constraint of penetrability of the input shaft module 120 or a condition of using a separate auxiliary structure, may include an internal-gear integrated main body 110 in which a plurality of components for speed reduction are mounted, the input shaft module 120 (see FIGS. 9 and 10) for inputting rotary power from a motor, and an output shaft module 130 (see FIGS. 11 and 12) for reducing and outputting the rotary power of the motor.

The internal-gear integrated main body 110 is a structure to be engaged with a conjugate planetary gear 160, that is, a pair of conjugate planetary gears 160, which is described later.

An internal gear 111 is formed on an inner wall of the internal-gear integrated main body 110 for meshing with the conjugate planetary gear 160. The internal gear 111 is integrally formed on the inner wall of the internal-gear integrated main body 110.

Various components including the input shaft module 120 and the output shaft module 130 that are described above, in particular, a plurality of components for speed reduction, are mounted on the internal-gear integrated main body 110. These components are sequentially described below.

The through-holes 112 are formed in a circumference of the internal-gear integrated main body 110. The through-holes 112 are provided for coupling to an input shaft installation plate 191 by using a bolt 194a.

In other words, the input shaft installation plate 191 for installation of the input shaft module 120 is provided at one side of the internal-gear integrated main body 110, and for coupling between the input shaft installation plate 191 and the internal-gear integrated main body 110, the through-holes 112 and 191a are respectively formed in the internal-gear integrated main body 110 and the input shaft installation plate 191. Accordingly, by inserting the bolt 194a into the through-holes 112 and 191a, the internal-gear integrated main body 110 and the input shaft installation plate 191 may be coupled to each other.

A first pass hole 191b through which the input shaft module 120 passes, in particular, a second input shaft module 122, is formed at a center portion of the input shaft installation plate 191.

In a peripheral structure of the input shaft installation plate 191, a motor installation plate 192 is coupled to the input shaft installation plate 191. A motor (not shown) for providing rotary power may be coupled to the motor installation plate 192.

The motor installation plate 192 may also be coupled to one side of the input shaft installation plate 191 by using a bolt 194b. A second pass hole 192a through which the input shaft module 120, in particular, the second input shaft module 122, passes, is formed at the center portion of the motor installation plate 192.

An input shaft clamp 193, as a device to clamp a second module tail 122d of the input shaft module 120, in particular, the second input shaft module 122, which is exposed through the second pass hole 192a of the motor installation plate 192, is provided at the motor installation plate 192.

The input shaft clamp 193 may include a clamp body 193a having a cut portion, and a fastening screw 193b provided at the cut portion of the clamp body 193a and fastening the cut portion. The motor connected to the motor installation plate 192 and the input shaft module 120 may be connected to each other by fastening the fastening screw 193b when the second module tail 122d of the input shaft module 120, in particular, the second input shaft module 122, is arranged inside the clamp body 193a. In particular, as the input shaft clamp 193 is used differently from the related art, the convenience of a user may be improved.

The input shaft module 120 that is connected to the internal-gear integrated main body 110 serves to receive an input of the rotary power from the motor connected to the outside of the internal-gear integrated main body 110. In other words, when the motor rotates, a rotational force thereof may be transferred via the input shaft module 120 without change.

According to the related art, since the input shaft, that is, the input shaft module 120, is provided as one body, when a tooth shape on an outer circumferential surface of a rear end portion of the input shaft is greater than the space at the center of the speed reducer, the input shaft is unable to pass through a center space of a main body of the speed reducer so that the input shaft may not be installed at all or a separate auxiliary structure for the installation is needed. Consequently, an installation volume may be difficult to be reduced, and accordingly implementation of a relatively low reduction ratio may be restricted.

However, for the present embodiment, since the input shaft module 120, unlike the related art, forms one body as the input shaft module 120 divided into two parts and then coupled to each other, the problem of the related art can be solved.

In other words, since the second input shaft module 122 is fixed to the input shaft clamp 193, and a first input shaft module 121 is arranged at the opposite side and is coupled to the second input shaft module 122, there is no need to increase the diameter of the first input shaft module 121 and thus installation thereof is not restricted and no separate auxiliary structure for the installation is needed.

In particular, since an input gear 121c formed at an end portion of the first input shaft module 121 is arranged at a flat output shaft 131 of the output shaft module 130, reduction of the installation volume may be implemented and the implementation of a low reduction ratio may be relatively advantageous.

The input shaft module 120 configured as above, as illustrated in detail in FIGS. 9 and 10, may include the first input shaft module 121 having one end portion arranged at the side of the flat output shaft 131 of the output shaft module 130, and the second input shaft module 122 connected to the motor and coupled to the first input shaft module 121.

The first input shaft module 121 may include a first module head 121a arranged at the side of the flat output shaft 131 of the output shaft module 130 and having an outer surface to which the input gear 121c is connected, and a first module shaft 121b connected to the first module head 121a and inserted in the second input shaft module 122. As the input gear 121c formed on the outer surface of the first module head 121a has a wedge-type tooth shape, the operation of the input gear 121c may become flexible.

The second input shaft module 122 may include a second module body 122a, in which a shaft hole 122b in which the first module shaft 121b is inserted is formed, and the second module tail 122d connected to the second module body 122a and having a diameter greater than that of the second module body 122a, and having a plurality of cut portions 122e formed at an end portion thereof. As described above, the second module tail 122d may be fixed to the input shaft clamp 193.

The first input shaft module 121 and the second input shaft module 122 should not arbitrarily rotate when they are coupled to each other. In other words, the first input shaft module 121 should not run idle with respect to the second input shaft module 122 fixed to the input shaft clamp 193.

To this end, a key block 121d is provided on an outer wall of the first module shaft 121b, and a key groove 122c, into which the key block 121d is inserted to correspond to the shape thereof, is formed in the shaft hole 122b. Accordingly, when the first input shaft module 121 and the second input shaft module 122 are coupled to each other, the key block 121d and the key groove 122c are coupled to each other to fit with each other, the idling of the first input shaft module 121 may be prevented.

To facilitate smooth rotation of the input shaft module 120 and prevent leakage of oil provided to the input shaft module 120, an input shaft support bearing 125 and an input shaft oil seal 126 are provided around the input shaft module 120. A C-ring 127 supporting the input shaft support bearing 125 is provided around the input shaft support bearing 125.

The output shaft module 130 is connected to the input shaft module 120 via a plurality of components to interact with each other, and reduces and outputs the rotary power of the motor input from the input shaft module 120.

The output shaft module 130, as illustrated in FIGS. 11 and 12, may mainly include the flat output shaft 131, wherein the input gear 121c of the input shaft module 120 is arranged at a center portion thereof, and a precession prevention plate 132 coupled to the flat output shaft 131 and preventing generation of a precessional motion.

An input gear arrangement portion 131a, in which the input gear 121c of the first input shaft module 121 is arranged, is formed at the center portion of the flat output shaft 131.

A plurality of planetary gears arrangement portions 131b, in which a plurality of isotropic 1-stage planetary gears 140 meshed with the input gear 121c are rotatably arranged, are formed around the input gear arrangement portion 131a. All centers of the input gear arrangement portion 131a and the planetary gear arrangement portions 131b may have a through-hole shape for connection to neighboring structures.

A plurality of spaced legs 131c are formed at one side of the flat output shaft 131 toward the precession prevention plate 132, and a plurality of bolt holes 131d are formed in the spaced legs 131c. The spaced legs 131c are plurally provided along the circumferential direction of the flat output shaft 131. The flat output shaft 131 and the precession prevention plate 132 may be coupled to each other by the spaced legs 131c while being spaced apart from each other by the length of each of the spaced legs 131c.

A plurality of through-holes 132a connected to the bolt holes 131d of the spaced legs 131c are formed in the precession prevention plate 132. Accordingly, by inserting a plurality of bolts B into the through-holes 132a of the precession prevention plate 132 to be coupled to the bolt holes 131d formed in the spaced legs 131c of the flat output shaft 131, the flat output shaft 131 and the precession prevention plate 132 may be connected to be one body.

A plurality of vibration prevention pins 133 for alleviating output vibration are coupled between the flat output shaft 131 and the precession prevention plate 132. The vibration prevention pins 133 are provided in an interval therebetween.

A plurality of pin holes 131e and 132e are respectively formed in the flat output shaft 131 and the precession prevention plate 132 so that the vibration prevention pins 133 are coupled between the flat output shaft 131 and the precession prevention plate 132. The pin holes 131e formed in the flat output shaft 131 may be arranged around the bolt holes 131d of the spaced legs 131c.

The internal planetary reduction gear 100 according to the present embodiment may further include, for a speed reduction operation, a plurality of isotropic 1-stage planetary gears 140, a plurality of crank shafts 150, and the conjugate planetary gears 160.

The isotropic 1-stage planetary gears 140 are arranged in a circumferential direction of the first module head 121a forming the first input shaft module 121 of the input shaft module 120 and meshed with the input gear 121c of the first module head 121a to be interlocked with each other. In other words, when the input shaft module 120 is rotated by the motor, the isotropic 1-stage planetary gears 140 meshed with the input gear 121c of the input shaft module 120 may also rotate.

The isotropic 1-stage planetary gears 140 are arranged spaced apart from each other at an isometric angle, rotatably and respectively arranged in the planetary gear arrangement portions 131b of the flat output shaft 131 forming the output shaft module 130, and respectively connected to the crank shafts 150. As such, since the crank shafts 150 are connected to the isotropic 1-stage planetary gears 140 by passing through the flat output shaft 131, the centers of the planetary gear arrangement portions 131b are penetrated.

An output shaft sealing cover 171 and an output shaft oil seal 172 for preventing escape of the isotropic 1-stage planetary gears 140 and finishing an end portion of the internal planetary reduction gear 100 are arranged adjacent to the isotropic 1-stage planetary gears 140 and coupled to the flat output shaft 131.

The output shaft oil seal 172 is arranged between the output shaft sealing cover 171 and the flat output shaft 131, and the output shaft sealing cover 171 is coupled to the flat output shaft 131 by using bolts B1.

The crank shafts 150 may be connected to the isotropic 1-stage planetary gears 140 and the conjugate planetary gear 160. The crank shafts 150 may be provided as many as the number of the isotropic 1-stage planetary gears 140. In the present embodiment, three isotropic 1-stage planetary gears and three crank shafts are provided as the isotropic 1-stage planetary gears 140 and the crank shafts 150, respectively.

Each of the crank shafts 150 may include a rotary shaft 151 having one end portion connected to the isotropic 1-stage planetary gears 140 and rotated according to the rotation of the isotropic 1-stage planetary gears 140, and a plurality of eccentric cams 152 connected to the rotary shaft 151 with a phase difference of a predetermined interval.

A D-cut processed portion 151a is formed at one end portion of the rotary shaft 151 to prevent idling of the crank shafts 150 and the isotropic 1-stage planetary gears 140, and a non-circular hole 141, to which the D-cut processed portion 151a is coupled, is formed in the isotropic 1-stage planetary gears 140.

An existing spline combination between the crank shafts 150 and the isotropic 1-stage planetary gears 140 may be considered to prevent the idling of the crank shafts 150 and the isotropic 1-stage planetary gears 140. In this case, however, the number of teeth for implementing a spline increases, and thus it may be confused to select a reference tooth when assemble the crank shafts 150 and the isotropic 1-stage planetary gears 140.

However, as in the present embodiment, when the D-cut processed portion 151a is formed at one end of the rotary shaft 151 and the non-circular hole 141 is formed in the isotropic 1-stage planetary gears 140 corresponding thereto, it may be easy to recognize the phase during the assembly of the crank shafts 150 and the isotropic 1-stage planetary gears 140.

The eccentric cams 152 are structures connected to the rotary shaft 151 with a phase difference of a predetermined interval, and each of the eccentric cams 152 is connected to the conjugate planetary gear 160. For the connection therebetween, a plurality of support devices are used, but illustration and description thereof are omitted herein.

In the conjugate planetary gear 160, a module through-hole 162 through which the input shaft module 120 passes is formed at a center portion thereof and an external gear 161 meshed with the internal gear 111 of the internal-gear integrated main body 110 is formed on an outer wall thereof. The conjugate planetary gear 160 is a gear that is connected to the eccentric cams 152 of the crank shafts 150 and performs a translational rotational motion according to the rotation of the crank shafts 150. A pair of conjugate planetary gears may be provided as the conjugate planetary gear 160.

A spaced leg pass hole 163 through which each of the spaced legs 131c of the flat output shaft 131 passes is formed in a portion outside the center portion of the conjugate planetary gear 160.

A conjugate output shaft support major axis angular ball bearing 173 for supporting the conjugate planetary gear 160 may be coupled to both sides of the conjugate planetary gear 160.

The operation of the internal planetary reduction gear 100 configured as above is described below.

When the motor as an external power source is operated, the input shaft module 120 connected to a shaft of the motor rotates. In other words, when the second input shaft module 122 of the input shaft module 120 connected to the shaft of the motor rotates, the first input shaft module 121 that is shaft-coupled to the second input shaft module 122, forming one body, may rotate.

When the first input shaft module 121 rotates the isotropic 1-stage planetary gears 140 meshed with the input gear 121c of the first input shaft module 121 rotates.

When the isotropic 1-stage planetary gears 140 rotate, the crank shafts 150 connected to the isotropic 1-stage planetary gears 140 receives a rotational force and performs rotation and revolution.

In this state, while performing the rotation and revolution motions, the crank shafts 150 performs a speed reduction motion according to a predetermined reduction ratio, that is, a meshing ratio between the input shaft module 120 and the isotropic 1-stage planetary gears 140 meshed therewith. At the same time, the conjugate planetary gear 160 on the eccentric cams 152 of the crank shafts 150 performs a translational rotational motion.

The speed reduction motion of the crank shafts 150 is transferred to the output shaft module 130, thereby outputting a speed reduction motion according to a desired reduction ratio.

According to the present embodiment having the above structure and operation, since the input shaft module 120 may be easily installed without a constraint of penetrability of the input shaft, that is, the input shaft module 120, or a condition of using a separate auxiliary structure, an installation volume may be reduced and a reduction range may be improved compared to the related art.

While this inventive concept has been particularly shown and described with reference to preferred embodiments thereof, it will be understood by those of ordinary skill in the art that various changes in form and details may be made therein without departing from the spirit and scope of the inventive concept as defined by the appended claims. Therefore, the scope of the inventive concept is defined not by the detailed description of the inventive concept but by the appended claims, and all differences within the scope will be construed as being included in the present inventive concept.

INDUSTRIAL APPLICABILITY

The present inventive concept may be used for industrial machinery, semiconductor or flat display manufacturing equipment, various kinds of logistics equipment, etc., as well as various machine tools requiring a rotational motion or a linear motion.

The invention claimed is:
1. An internal planetary reduction gear comprising:
an internal-gear integrated main body having an internal gear integrally formed on an inner wall thereof, and on which a plurality of components for speed reduction are mounted, the plurality of components comprising;
an input shaft module formed as a single body by coupling at least two separated parts with each other, having an input gear formed on an end portion thereof, and connected to the internal-gear integrated main body; and
an output shaft module connected to the input shaft module to interact therewith and reducing and outputting a speed of the rotary power of the motor that is input from the input shaft module,
wherein the input shaft module comprises:
a first input shaft module having one end portion arranged at a side of the output shaft module, and
a second input shaft module connected to the motor and coupled to the first input shaft module,
wherein the first input shaft module comprises:
a first module head arranged at the side of the output shaft module and having an outer surface to which the input gear is connected; and
a first module shaft connected to the first module head and inserted into the second input shaft module.
2. The internal planetary reduction gear of claim 1, wherein the second input shaft module comprises:
a second module body having a shaft hole in which the first module shaft is inserted; and
a second module tail connected to the second module body, formed to have a diameter greater than the second module body, and having a plurality of cut portions formed on an end portion thereof.
3. The internal planetary reduction gear of claim 2, wherein a key block is formed on an outer wall of the first module shaft to restrict arbitrary rotation of the first input shaft module, and a key groove, into which the key block is inserted to correspond to the shape thereof, is formed in the shaft hole.

4. The internal planetary reduction gear of claim 1, wherein the input gear has a wedge-type tooth shape.

5. The internal planetary reduction gear of claim 1, further comprising a plurality of isotropic 1-stage planetary gears that are arranged in a circumferential direction of the first module head and meshed with the input gear of the first module head to be interlocked with each other.

6. The internal planetary reduction gear of claim 5, wherein the plurality of isotropic 1-stage planetary gears are arranged at a side of the output shaft module.

7. The internal planetary reduction gear of claim 5, further comprising a plurality of crank shafts, each crank shaft comprising:
   a rotary shaft having one end portion connected to each of the plurality of isotropic 1-stage planetary gears and rotated according to a rotation of each of the isotropic 1-stage planetary gears; and
   an eccentric cam connected to the rotary shaft with a phase difference of a predetermined interval.

8. The internal planetary reduction gear of claim 7, wherein a D-cut processed portion is formed on one end portion of the rotary shaft to prevent idling of the plurality of crank shafts and the plurality of the isotropic 1-stage planetary gears, and
   a non-circular hole, to which the D-cut processed portion is coupled, is formed in each of the plurality of the isotropic 1-stage planetary gears.

9. The internal planetary reduction gear of claim 7, further comprising a plurality of conjugate planetary gears, wherein a module through-hole, through which the input shaft module passes, is formed at a center portion of each of the plurality of conjugate planetary gears, an external gear meshed with an internal gear of the internal-gear integrated main body is formed on an outer wall of each of the plurality of conjugate planetary gears, and each of the plurality of conjugate planetary gears is connected to the eccentric cam of each of the plurality of crank shafts and performs a translational rotational motion according to a rotation of the plurality of crank shafts.

10. The internal planetary reduction gear of claim 1, wherein the output shaft module comprises:
   a flat output shaft having a center portion at which the input gear of the input shaft module is arranged; and
   a precession prevention plate coupled to the flat output shaft and preventing generation of a precessional motion.

11. The internal planetary reduction gear of claim 10, wherein the output shaft module further comprises a vibration prevention pin that is coupled to the flat output shaft and the precession prevention plate and preventing output vibration.

12. The internal planetary reduction gear of claim 11, wherein a plurality of spaced legs, in which a plurality of bolt holes are formed, are provided at one side of the flat output shaft toward the precession prevention plate, and a plurality of through-holes connected to the plurality of bolt holes of the plurality of spaced legs are formed in the precession prevention plate,
   the flat output shaft and the precession prevention plate, which are spaced apart from each other as long as the plurality of the spaced legs, are coupled to each other by using a plurality of bolts, forming one body, and
   a plurality of pin holes are formed in each of the flat output shaft and the precession prevention plate so that the vibration prevention pin is coupled between the flat output shaft and the precession prevention plate, wherein the pin hole formed in the flat output shaft is arranged around the plurality of bolt holes of the plurality of spaced legs.

13. The internal planetary reduction gear of claim 1, further comprising an input shaft installation plate that is coupled to one side of the internal-gear integrated main body for installation of the input shaft module.

14. The internal planetary reduction gear of claim 13, further comprising a motor installation plate that is coupled to the input shaft installation plate for installation of the motor.

15. The internal planetary reduction gear of claim 14, further comprising an input shaft clamp that is connected to the motor installation plate and clamping the input shaft module,
   wherein the input shaft clamp comprises:
   a clamp body having a cut portion; and
   a fastening screw provided at the cut portion of the clamp body and fastening the cut portion of the clamp body.

* * * * *